(No Model.) 2 Sheets—Sheet 1.
S. L. WIEGAND & W. H. BURR.
PIPE WRENCH.
No. 547,653. Patented Oct. 8, 1895.
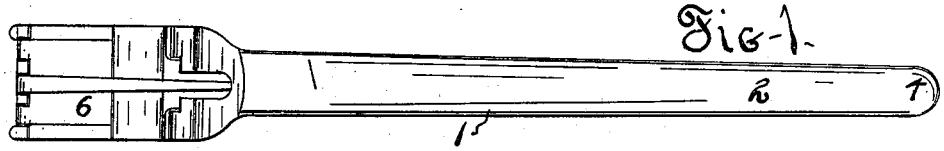
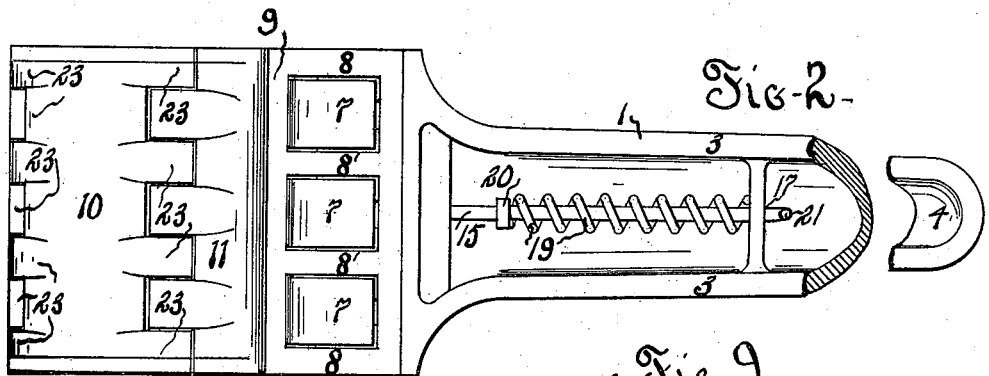
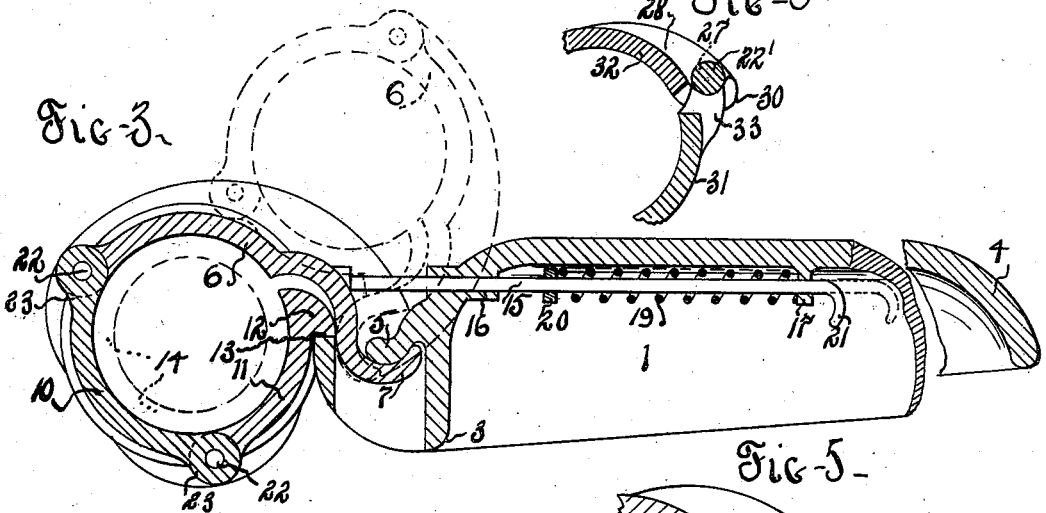
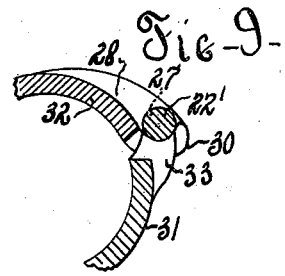
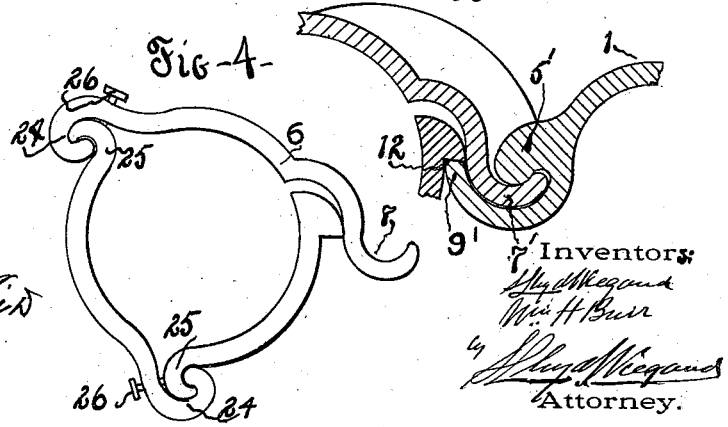
Witnesses:
Inventors:
Attorney.

(No Model.) 2 Sheets—Sheet 2.
S. L. WIEGAND & W. H. BURR.
PIPE WRENCH.
No. 547,653. Patented Oct. 8, 1895.
Fig. 2ª
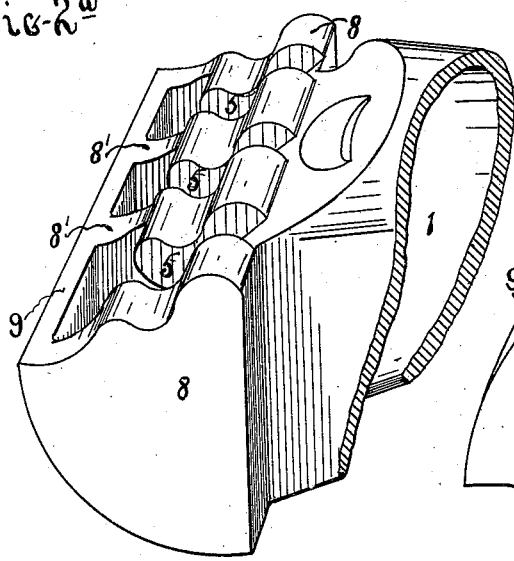
Fig. 2ᵇ
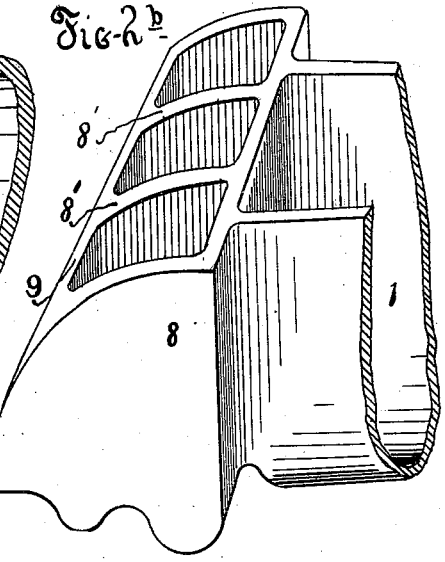
Fig. 6.
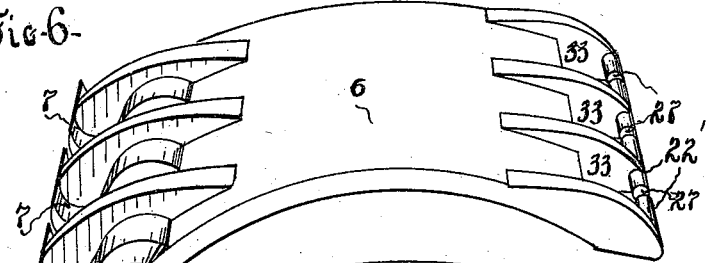
Fig. 7.
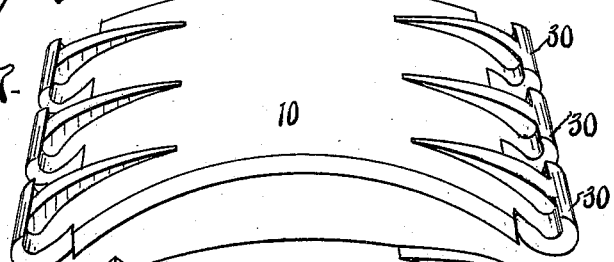
Fig. 8.
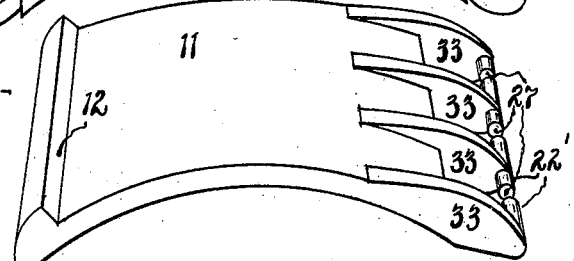
Witnesses:
Lacey D. Cadwallader,
Cyrus R. Morgan (Ind.)
Inventors:
S. L. Wiegand
Wm. H. Burr
by S. L. Wiegand
Attorney.

UNITED STATES PATENT OFFICE.

S. LLOYD WIEGAND AND WILLIAM H. BURR, OF PHILADELPHIA, PENNSYLVANIA.

PIPE-WRENCH.

SPECIFICATION forming part of Letters Patent No. 547,653, dated October 8, 1895.

Application filed January 11, 1895. Serial No. 534,571. (No model.)

*To all whom it may concern:*

Be it known that we, S. LLOYD WIEGAND and WILLIAM H. BURR, citizens of the United States, residing at Philadelphia, in the county of Philadelphia and State of Pennsylvania, have invented certain new and useful Improvements in Pipe-Wrenches; and we do hereby declare the following to be a sufficiently full, clear, and exact description thereof as to enable others skilled in the art to make and use the said invention.

This invention relates to wrenches for grasping and turning cylindric objects, such as pipes and screw-rods, and has for its object the firm and secure holding of such objects without injury to them by crushing or by indenting or abrasion of the surfaces thereof, the easy application and release of the wrenches from such objects, better facility of changing for different sizes of pipes the grasping-segments from engagement with the operating-lever, and by reason of the improved construction and form of parts greater strength and durability with less weight of material, a less risk of defects in the production of parts by casting, usually attributable to inequalities in thickness of metal causing shrinkage-cracks, the thicker parts setting and contracting after the metal of the thinner parts has become set.

To accomplish these several desiderata this invention consists in a hollow lever provided with fulcrums formed integrally therewith, all of practically uniform thickness of metal throughout each cross-section in different parts of its length, a spring-bolt fitted therein to engage and control the position of the grasping-segments, and several series of segments interchangeably fitted to the fulcrums in the lever and adapted to fit and evenly grasp the circumference of pipes or rods of different diameter, such segments being also formed of practically uniform thickness of material and fitted to interlock with each other with pivotal or hinge-like connections.

The construction of this invention and its operation is hereinafter fully described and shown in the accompanying drawings, in which—

Figure 1 shows a plan or top view; Fig. 2, a shortened inverted plan view on a larger scale. Figs. $2^a$ and $2^b$, respectively, show enlarged perspective views of the fulcrum end portion of the lever-handle in erect and inverted positions; Fig. 3, a shortened central section on a larger scale. Fig. 4 shows a side view of a set of the grasping-segments with a modified form of joint connection. Fig. 5 shows a modified form of joint between the lever and the segments of the ring. Figs. 6, 7, and 8 are severally enlarged perspective views of each of the separate jaws forming the grasping-ring, showing a modified form of joint for connecting the several segments. Fig. 9 shows in section the parts of one of the joints between the segments of the grasping-ring of the construction as shown in Figs. 6, 7, and 8.

Referring to the drawings, 1 represents the lever-handle, formed hollow of nearly uniform thickness of metal through each part of its cross-section, in the form of an open trough, the cylindric-convex surface 2 of which receives the pressure of the hand in using the wrench. The edges 3 are rounded and the outer end 4 made of rounded form. The opposite end of the lever 1 has formed with it a hooked fulcrum 5, to which a segment 6 is hooked by a correspondingly-shaped hook 7, so as to form a hinge-joint. Cheeks or side plates 8, braces 8', and a cross-bar 9 are formed with the lever 1, so as to confine the hooks 7 of the segment 6 laterally on the hooked fulcrum 5. When in normal position, as shown in the full line in Fig. 3, the hook 7 is held by the cross-bar 9 from becoming disengaged from the fulcrum 5; but when raised to the position indicated by the dotted portion of Fig. 3 then the segment 6 is easily detached by lifting the hook 7 through the space between the bar 9 and the fulcrum 5. To the opposite end of the segment 6 is hinged a second segment 10 and to this a third segment 11, the outer end of which is provided with a hooked lip 12, which engages with a fulcrum 13 on the cross-bar 9 of the lever 1, having its axis parallel with that of the fulcrum 5.

When a cylindric body—such, for instance, as an iron pipe 14—of a diameter adapted to fill the ring formed by the segments 6, 10, and 11 is placed within it and pressure applied to the convex side of the lever 1, the force transmitted from the fulcrums 5 and 13, respectively, to the hook 7 and the lip 12 contracts the ring formed of the segment 6, 10, and 11 forcibly with such an equalized pressure upon the inclosed pipe 14 that it is grasped without abrading or crushing it and turns with the segments and lever. When pressure is applied in an opposite direction to the lever 1, the grasp of the segments 6, 10, and 11 is released from the pipe, and if after the relief of the grasp such motion is continued the fulcrum 13 becomes disengaged from the hook or lip 12, the ring or segment is opened and may be detached from the pipe 14. In the use of this wrench such prompt disengagement from the pipe is undesirable, because there are many situations of limited space in which the wrench and pipe cannot be turned by a continuous rotary motion, but must be moved by a reciprocating motion of the wrench.

To permit the reverse motion of the wrench when relaxed from the pipe without disengaging the hook 7 from the fulcrum 5 a bolt 15 is fitted to slide in guides 16 and 17, formed in the lever 1, the end 18 of which bolt presses by reason of the reaction of a spring 19 against a collar 20 and the guide 17 upon the segment 6, so as to hold the hook 7 in engagement with the fulcrum 5. By retracting the bolt 15 by means of the handle 21 the hook 12 of the segment 11 is released from the fulcrum 13, and the ring of segments is thus opened and the pipe 14 released. By further retracting the bolt 15 the segment 6 may be turned back into the position shown in dotted lines in Fig. 3, and the ring of segments 6, 10, and 11 opened and detached from the handle 1 and another ring substituted.

The joints between segments 6 and 10 and 10 and 11 are shown in Figs. 1, 2, and 3 as made with pivotal pins 22, fitted in perforations in knuckles 23. As shown in Fig. 4, this joint is made by pairs of interlocking hooks 24 and 25, which from their form hold in engagement with each other while closed, and are so held when opened by screws, pins, or rivets 26, secured to one of the segments and overlapping the hook on the contiguous segment.

As shown in Figs. 6, 8, and 9, the segments 6 and 11 are formed integrally with webs or ribs 33 and short pivots 22′ with spaces 27 between them. The hooks 30 on the segment 10 are braced by webs 28 and are formed integrally therewith. These hooks 30 engage the pivots 22′ in the segments 6 and 11 with the webs 28 in the spaces 27, forming strong and compact joints.

In Fig. 5 a modification of the joint between the fulcrum 5′ and hooks 7 is shown. The bar 9′, which rests upon the hook 12, is attached to the fulcrum 5′ and lever 1 without the intervening braces 8 and 8′.

For convenience in handling the several segments, as linked together when applying them to a pipe or like object, the opening motion between the segments 10 and 11 is restricted, so that the segment 11 may be easily pressed under and upward behind a pipe by holding either the segment 6 or 10 in the hand. The cavity or grooved hollow of the lever 1 affords a good protection from injury and support for the spring-bolt, which while it can be easily and instantly retracted to disengage the gripping-segments is not liable while in use to be accidentally liberated.

These wrenches are from the form of their several parts most economically made by casting, and to insure the requisite tenacity and strength demanded of them in service are made of steel castings or malleable iron castings. Both of these materials at the time of casting are brittle and only acquire their ductility and tenacity by subsequent treatment, and when cast to avoid cracks from local contraction in cooling should be of such forms as to present throughout each part of their length nearly the same thickness of metal in the cross-sections, the lengthwise contraction not being so important as affecting the strength and soundness of the casting. For this reason the hollow shell-shaped lever-handle, avoiding all abrupt changes of thickness, and the segments having thin interlocking hooks instead of interlocking knuckles of greater thickness than the other portion of the segments, are less liable to be defective, and from their structural form are stronger than separate pivotal pins, which latter are liable to bend under stress and thus impair the diametral dimensions of the ring of segments.

The form of the several parts as described and shown furnishes the requisite strength to resist the stresses to which the different portions are exposed when in use and comply with the above-recited conditions demanded for their sound production in casting.

Having described our invention and the operation thereof, what we claim is—

1. In a pipe-wrench the lever or handle 1 segments 6, 10 and 11, hinged to each other, and fulcrums 5 and 13 formed on said handle engaging the segments 6 and 11 in combination with the sliding bolt 15 and spring 19 arranged to operate as and for the purpose set forth.

2. In a pipe-wrench handle of the character described the hollow shell 1 guides 16 and 17 fulcrums 5 and 13, cheeks 8 and cross-bar 9, formed integrally of metal of substantially uniform thickness throughout each cross section at the several parts of their length as and for the purpose set forth.

3. In a pipe-wrench of the character described and shown segmental links adapted to form when assembled, a contractible gripping ring, in combination with interlocking hooks and pivots formed integrally therewith and hooks 7 and 12 adapted to be contracted by a suitable lever with corresponding fulcrums substantially as set forth.

4. In a pipe-wrench of the character described, and shown, segmental links provided with interlocking hooks formed integrally therewith adapted as assembled to form a contractible clamping ring in combination with rivets or equivalent fastenings arranged to hold the hooks in interlocked position substantially as set forth and described.

S. LLOYD WIEGAND.
WM. H. BURR.

Witnesses:
C. R. MORGAN,
LACEY A. CADWALLADER.